United States Patent
Bass et al.

[11] 3,858,577
[45] Jan. 7, 1975

[54] FIBER OPTIC LASER LIGHT DELIVERY SYSTEM

[75] Inventors: Michael Bass, Pacific Palisades; Richard M. Dwyer, Glendale; Bernard J. Haverback, North Hollywood, all of Calif.

[73] Assignee: University of Southern California, Los Angeles, Calif.

[22] Filed: Apr. 5, 1974

[21] Appl. No.: 458,131

[52] U.S. Cl............... 128/8, 128/303.17, 128/398, 350/96
[51] Int. Cl............................................. A61b 1/06
[58] Field of Search ............... 128/4, 6, 8, 395, 398, 128/303.1, 303.17, DIG. 22; 350/96

[56] References Cited
UNITED STATES PATENTS

| | | | |
|---|---|---|---|
| 3,456,641 | 7/1969 | Yokota et al. | 128/4 |
| 3,467,098 | 9/1969 | Ayres | 128/303.1 |
| 3,471,215 | 10/1969 | Snitzer | 128/398 |
| 3,769,963 | 11/1973 | Goldman et al. | 128/303.1 |

OTHER PUBLICATIONS

Leon Goldman, "Lasers in Medicine", Gordon and Breach, Science Publishers, Inc., page 197.

*Primary Examiner*—Richard A. Gaudet
*Assistant Examiner*—Henry S. Layton
*Attorney, Agent, or Firm*—Harris, Kern, Wallen & Tinsley

[57] ABSTRACT

A flexible endoscope with a laser connected thereto for simultaneous viewing and performance of surgery on the interior stomach wall. A low power laser operating in the visible light range with the laser beam directed to one or more individual fiber optic fibers carried on an endoscope for performing laser surgery within a body cavity from an external position. A protective and replaceable cap for the distal end of the laser fiber.

15 Claims, 10 Drawing Figures

Patented Jan. 7, 1975 3,858,577

FIBER OPTIC LASER LIGHT DELIVERY SYSTEM

This invention relates to endoscopes and in particular, to a new and improved combination endoscope and surgical laser for performing surgical procedures within body cavities, such as the coagulation of a bleeding ulcer on a stomach wall.

Endoscopes and lasers are found in various configurations in the prior art. U.S. Pat. No. 3,643,653 shows an endoscope with a flexible line for introducing into the stomach. Within the line are three sets of fiber optic bundles and a tube. Two fiber optic bundles provide for light transmittal to the distal end of the instrument and the third fiber optic bundle provides for viewing the stomach interior illuminated by the first two bundles. The tube provides for fluid flow into the stomach.

U.S. Pat. No. 3,327,712 shows a surgical device utilizing a plurality of fiber optic bundles for transmitting low intensity light to an eye, for viewing the eye, and for transmitting high intensity light such as that from a mercury arc lamp. A lens is provided at the distal end for focussing. A similar instrument operating in the ultraviolet region is shown in U.S. Pat. Nos. 3,456,641 and 3,494,354.

U.S. Pat No. 3,471,215 shows an instrument utilizing a ruby laser and one or more fiber optic fibers to form a flexible device for directing energy to a body cavity or the like. A bundle of fibers is preferred, with each fiber having a special makeup in the form of a core of glass surrounded by a cladding of a lower refractive index glass. The output end terminates in a tube for directing the laser beam to the work surface. This patent also states that it would appear that high intensity laser output energy could readily be focussed and concentrated directly upon the end of a fiber optic core or upon the ends of a plurality of such cores in a bundle, but goes on to state that such an arrangement will not perform satisfactorily because of hot spots and then discloses the claimed subject matter as the solution for the problem.

U.S. Pat. No. 3,467,098 shows a laser type surgical instrument wherein the laser beam is transmitted through a flexible tube with the distal end hand held by the surgeon. U.S. Pat. No. 3,693,623 shows another hand held laser instrument utilizing a single glass fiber as the conductor for energy from a gas laser, with the output provided through a hollow tube. None of these flexible laser instruments have any provision for viewing.

U.S. Pat. Nos. 3,417,754; 3,456,651; and 3,547,125 show opthamological instruments which are hand held and self contained providing for laser surgery on the eye.

These prior art devices have various disadvantages and it is an object of the present invention to provide a new and improved instrument which can be used for laser surgery and not have the disadvantages of the prior art. It is desired to have a flexible instrument which can be introduced into the stomach and which will provide viewing and a high intensity laser beam at the same time.

It has been found that high intensity laser energy can be transmitted on a single flexible glass fiber and on a plurality of such fibers operated in parallel. However, the fibers cannot be maintained in the conventional bundle because the heat generated will melt the cement and damage the instrument. Rather, the laser beam in the instrument of the invention is focussed onto a single fiber and the energy is transmitted through the individual fiber. Instruments may be provided with a plurality of individual fibers which may be used for additional energy transmission in parallel. However the principle reason for providing a plurality of individual fibers is to have a replacement available within the instrument in the event of breakage of the fiber being used for energy transmission.

It is also highly desirable to provide protection for the distal end of the fiber which is susceptible to damage during the surgical procedure. It is a further object of the invention to provide several embodiments for the distal end of the laser conducting fiber.

Other objects, advantages and results will more fully appear in the course of the following description. The drawing merely shows and the description merely describes preferred embodiments of the present invention which are given by way of illustration or example.

Figure 1:
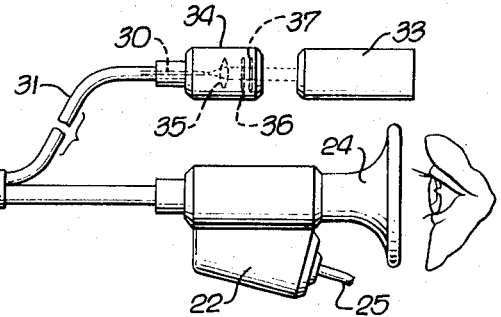
FIG. 1 is a view of an endoscope with laser incorporating the presently preferred embodiment of the invention.

The instrument of FIG. 1 includes an endoscope 15 which may be conventional in design, such as that shown in the aforementioned U.S. Pat. No. 3,643,653. The endoscope may include fiber optic fiber bundles 16, 17 and 18 and a tube 19 in a sheath 20. The bundles 16, 17 provide for light transmission from a light source in a housing 22 to the distal end 23 of the instrument. The bundle 18 provides image transmission from the distal end to the eye piece 24 at the proximal end. The tube 19 provides for fluid transmission from an inlet 25 to the distal end of the instrument. The bundles 16, 17, 18 may be conventional in construction, each comprising a plurality of glass fibers bonded together to form the flexible bundle.

Figure 2:
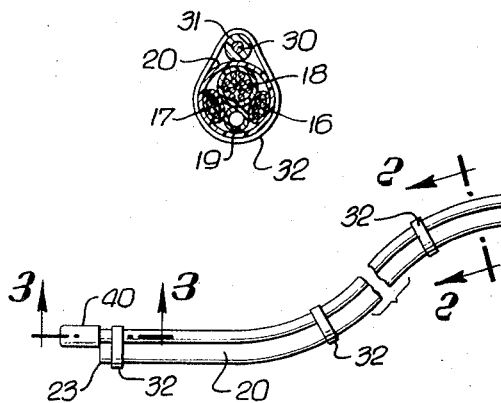
FIG. 2 is an enlarged sectional view taken along the line 2—2 of FIG. 1.

Another fiber optic fiber is carried on the endoscope and, in the embodiment of FIGS. 1 and 2, comprises a glass fiber 30 in a sheath 31 attached to the endoscope by straps 32. The separate fiber 30 provides for transmission of a laser beam from a laser 33 to the distal end of the instrument. The output beam of the laser is directed into the separate fiber 30 by coupling optics 34 which typically may comprise a lens or lens system 35, a shutter 36 and an attenuator 37.

Figure 3:
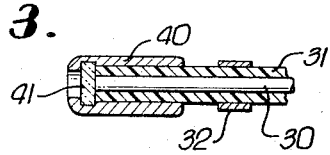
FIG. 3 is an enlarged sectional view taken along the line 3—3 of FIG. 1.

A replaceable protective cap may be provided for the distal end of the laser fiber 30 and in the embodiment of FIG. 3, comprises a sleeve 40, typically of stainless steel, and a transparent window 41, typically of glass, quartz, sapphire or the like.

In use, the instrument is inserted into the body cavity, typically the stomach, in the usual manner and the distal end is manipulated to illuminate and provide viewing of the area of interest, typically a bleeding site on the stomach wall. The surgeon sets the attenuator for the desired power and opens the shutter permitting transmission of the laser beam through the fiber 30 onto the tissue to coagulate the blood or cauterize the wound.

In a typical instrument, the fiber 30 will have a diameter in the order of 100 to 200 micrometers. The laser 33 may be a low power unit, normally not more than a few watts and typically providing in the order of one-half watt at the distal end of the instrument. This is in contrast to prior art laser cauterizing instruments which have operated in the 30 to 40 watts range.

In the instrument of the present invention, the laser beam is directed into the individual fiber, and fiber optic bundles are not utilized. When laser energy is directed into a bundle, the intense beam heats and burns the adhesive used in adhering the fibers in the bundle and produces irreparable damage to the fibers.

In the instrument of the invention, the laser output is in the visible range, preferably in the green or blue-green light range, which is readily transmitted by the flexible glass fiber. Further, the green light is substantially fully absorbed by blood resulting in maximum efficiency for coagulation. The flexible laser light delivery system with endoscope provides simultaneous viewing of a body cavity, such as the stomach wall, and delivers laser energy of sufficient intensity to coagulate, cauterize or cut the appropriately selected pathological area. The instrument can be utilized in any body cavity, natural or man made, and is readily controlled and guided from the outside by the physician.

Various conventional lasers may be used to produce modest power in the blue-green part of the spectrum, including the argon ion laser, the krypton ion laser, various dye lasers, and a frequency doubled neodymium-YAG laser.

It has been found that interaction of the laser energy at the distal end with organic or inorganic debris has a deleterious effect on the fiber. By way of example, food in the stomach or blood from a bleeding ulcer or debris created by the interaction of the laser energy with the target will be heated by the beam and, when present at or near the distal end of the fiber can produce heating of the end of the fiber and a nontransparent coagulum of material on the end of the fiber. Either of these events renders the instrument inoperable and normally requires replacement of the fiber.

In the present instrument, means are provided for protecting the end of the fiber, and for easily replacing the protective end. In the embodiment of FIG. 3, the transparent window 41 may be of a very hard material such as sapphire or quartz which resist damage. Also, the window is readily replaced by sliding off the sleeve 40, removing the damaged or coated window and replacing it with a new window. Other window constructions are shown in FIGS. 4–7 and will be described hereinbelow.

While a disk is illustrated for the window 41, a lens may be used as the window where desired.

The application of lasers for certain medical problems has become increasingly important in the past 5 to 6 years. The clinical application of lasers had pertained primarily to the field of opthalmology, dentistry, otolaryngology, surgery, dermatology, basic research for newer spectrophotometric measurements, microsurgery, and basic research problems. The use of laser energy for gastrointestinal problems has been restricted to the use of $CO_2$ laser energy at $10.6\mu m$, delivered to the stomach of animals through a rigid endoscope. This work was done at the University of Minnesota Medical Center by Goodall and Wangensteen. Their system suffers the following limitations: 1. The inability to direct the laser beam with the rigid delivery system. 2. The necessity to use a hollow scope since no convenient material to transmit $10.6\mu m$ light is available. 3. Of necessity by 1. and 2., the area of the gastrointestinal tract accessible to this system is greatly limited. 4. The inability to deliver laser energy to large areas of the gastronintestinal tract that are accessible by the use of fiber optic endoscopes.

The present invention provides a new system whereby laser energy can be transmitted along a flexible fiber optic of small dimensions in sufficient intensity to produce a desired effect anywhere in the gastrointestinal tract but can be applied to other body cavities and body areas wherein a flexible fiber optic facilitates the delivery of the laser energy.

Prior practice in laser cautery involved the use of the highest attainable total power and thus researchers generally turned to the $10.6\mu m$ $CO_2$ laser. This light, in the infrared, cannot be transmitted by any known flexible fiber optic delivery system because there are no materials with which to make a $10.6\mu m$ transmitting fiber. There are however excellent fiber optic devices for the transmission of visible light and it has been shown that a modest total power of light in the blue green part of the spectrum can, when concentrated to an area ~2mm in diameter, produce rapid hemostasis.

Figure 4:
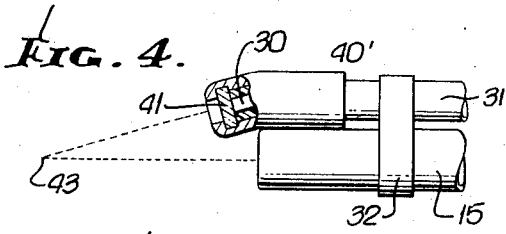
FIGS. 4, 5, 6 and 7 are views similar to FIG. 3 showing alternative embodiments of the invention.

In the embodiment of FIG. 4 a sleeve 40' similar to the sleeve 40 of FIG. 3, is provided with a bend for converging the lines of sight of the endoscope and laser fiber at a point 43.

Figure 5:
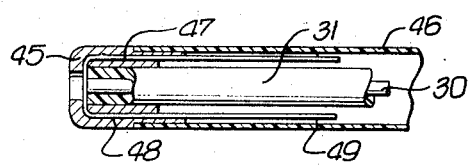

In the embodiment of FIG. 5, a guide member 45 is positioned on the sheath end of the fiber 30 and a sleeve or jacket 46 is positioned over the sheath fiber. A strip 49 of a thin flexible transparent material, such as a polyvinyl chloride or polyproplyene plastic, is fed down the sleeve 46, through a slot 47 in the guide member 45, across the end of the fiber 30, through another slot 48 in the guide member 45, and up the sleeve. At any time the portion of the strip 49 at the end of the fiber 30 becomes damaged or coated, the strip is pulled through the guide member to bring a fresh portion of the strip to the fiber end.

Figure 6:
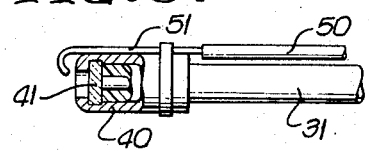

In the embodiment of FIG. 6, a tube 50 is carried along with the sheathed fiber and terminates in a nozzle 51 which provides for directing wash water or other fluid onto the exposed surface of the window 41 to keep it free of debris, blood and the like.

Figure 7:
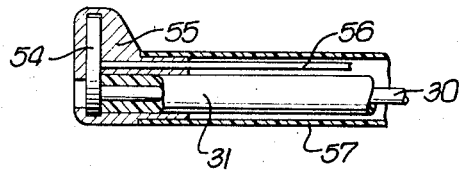

In the embodiment of FIG. 7, a window 54 is rotatably mounted in an end member 55. The window 54 is driven by a shaft 56 and a protective sheath 57 may be provided about the sheathed fiber. When the portion of the window 54 exposed at the end of the fiber becomes damaged or coated, a new portion of the window is rotated into working position by rotating the shaft 56 from the proximal end of the instrument.

Figure 8:
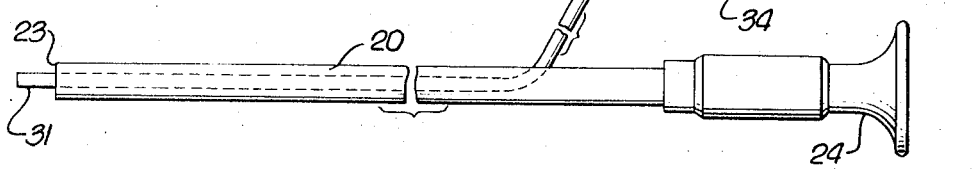
FIG. 8 is a view similar to that of FIG. 1 showing an alternative embodiment of the invention.

While the fiber 30 is shown carried on the side of the endoscope in FIG. 1, the fiber may also be positioned within the endoscope, as illustrated in FIG. 8. This may be accomplished in various configurations within the endoscope, one typical approach being to run the sheathed fiber down the tube 19.

Figure 9:
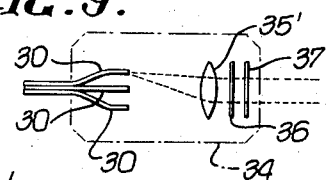
FIGS. 9 and 10 are partial views similar to that of FIG. 1 showing alternative embodiments of the invention.

While the embodiments disclosed so far have utilized a single separate fiber for the laser beam, a plurality of separate fibers may be utilized. The coupling optics 34 for one embodiment with a plurality of fibers 30 is illustrated in FIG. 9. In this embodiment, the lens system 35' functions to direct the laser beam into one of the fibers. In the event the fiber is damaged or broken, the lens system is manipulated to direct the laser beam into another of the fibers, thereby increasing the life of the instrument.

Figure 10:
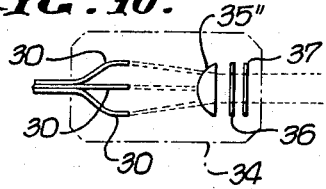

Another alternative embodiment for the coupling optics is shown in FIG. 10, with the lens system 35" directing separate laser beam into separate fibers. A fly-eye lens may be utilized for this purpose. In the embodiments of FIGS. 9 and 10, the plurality of fibers are not bundled, but rather are carried within the sheath separate from each other, although they may be in physical contact. In all instances, an individual laser beam is directed into a separate fiber so that none of the laser energy is outside of the fiber.

While a preferred fiber optic fiber of glass has been described, fibers of other materials such as plastic or quartz may be used.

We claim:

1. In an instrument for simultaneously viewing an internal surface of a body cavity and performing a surgical procedure on the surface from an external position, the combination of:
   a flexible endoscope having at least one bundle of fiber optic fibers and a distal end and a proximal end;
   another separate fiber optic fiber carried by said endoscope;
   a laser for generating an output beam; and
   coupling optics for coupling the laser output beam to the interior of said other fiber adjacent the proximal end of said endoscope, with said other fiber terminating at the distal end of said endoscope.

2. An instrument as defined in claim 1 including a plurality of separate fiber optic fibers carried by said endoscope, with said coupling optics including means for coupling the laser output beam to each of said separate fibers.

3. An instrument as defined in claim 1 including a plurality of separate fiber optic fibers carried by said endoscope, with said coupling optics including means for producing a plurality of separate beams and simultaneously coupling separate beams to each of said separate fibers.

4. An instrument as defined in claim 1 wherein said coupling optics includes a shutter for controlling said laser output beam.

5. An instrument as defined in claim 1 wherein said coupling optics includes an attenuator for controlling said laser output beam.

6. An instrument as defined in claim 1 wherein said laser provides an output beam in the visible light range.

7. An instrument as defined in claim 1 wherein said laser provides an output beam in the green range.

8. An instrument as defined in claim 1 wherein said laser provides an output at the distal end of said separate fiber of not more than a few watts.

9. An instrument as defined in claim 1 wherein said laser provides an output at the distal end of said separate fiber in the order of one-half watt.

10. An instrument as defined in claim 1 including a cap carried on the distal end of said separate fiber and having a transparent window overlying said distal end.

11. An instrument as defined in claim 10 with said cap having a bend for bending said separate fiber for converging the lines of sight through said endoscope and said separate fiber.

12. An instrument as defined in claim 1 including:
   a sleeve slideable onto the distal end of said separate fiber; and
   a replaceable transparent window carried in said sleeve and positionable at said distal end.

13. An instrument as defined in claim 1 including:
   guide means carried on the distal end of said separate fiber
   a flexible jacket about said separate fiber and terminating at said guide means; and
   a flexible transparent strip threaded from said proximal end through said jacket and said guide means, and back through said jacket to said proximal end;
   with said guide means guiding said strip across the distal end of said fiber, and with said strip movable in said sheath to present a new strip surface at said distal end.

14. An instrument as defined in claim 1 including:
   a cap carried on the distal end of said separate fiber and having a transparent window overlying said distal end; and
   means carried on said endoscope for delivering a fluid stream at the exposed surface of said window.

15. An instrument as defined in claim 1 including:
   a cap carried on the distal end of said separate fiber;
   a transparent window rotatably mounted in said cap, with a portion of said window overlying said distal end; and
   means carried on said endoscope for rotating said window.

* * * * *